FIG. 4
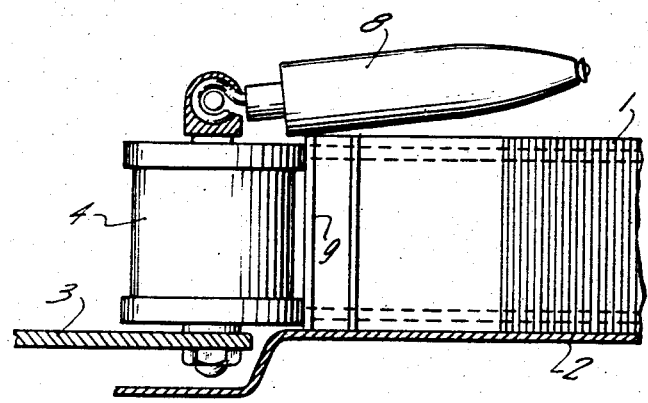
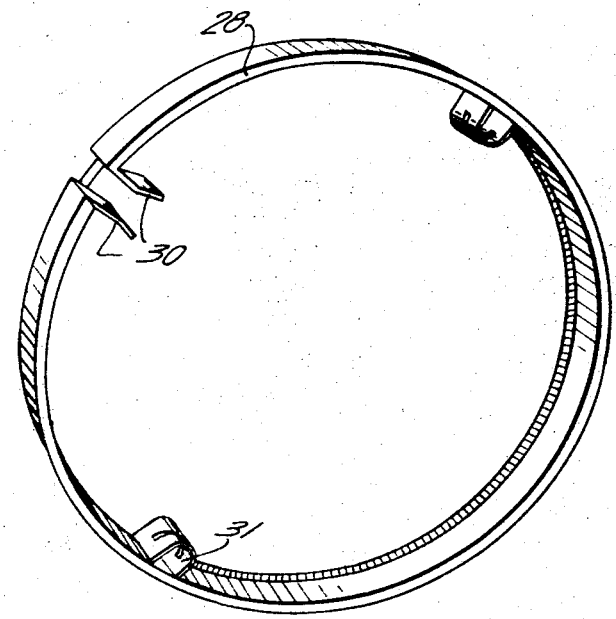
FIG. 3

United States Patent Office 3,352,506
Patented Nov. 14, 1967

3,352,506
FILM WINDING DEVICE
Alexandr Dmitrievich Bodrov, Vasily Vasiljevich Petrov, and Iosif Moiseevich Fonar, Moscow, U.S.S.R., assignors to Nauchno-Issledovatelsky Kinofotoinstitute, Moscow, U.S.S.R.
Filed June 1, 1964, Ser. No. 371,660
2 Claims. (Cl. 242—55.18)

The present invention relates to a winding device for a movie projector adapted for repeated projections of films without requiring a subsequent rewinding of film rolls for the next showing.

The proposed winding device is adapted for use in movie projectors for projecting films of various types and sizes, as well as for special purposes when a multiple running of film through a projector is necessary.

The winding devices of known movie projectors are characterized by the necessity of rewinding films in reverse direction in case of repeated runnings. Each rewinding of a film roll intensifies the wear on the film surface due to the reciprocal slippage of film turns. Besides that, the operation in question is a waste of time and effort on the part of a projectionist.

Wear takes place not only when rewinding film rolls, but also in the process of unwinding film in movie projectors provided with conventional unwinders, this wear being caused by a great film traction and reciprocal slippage of film turns in a roll of film.

Winding devices of movie projectors designed for the multiple running of films without rewinding the latter have already been suggested. However, these known winding devices either do not provide for the unwinding of films without the reciprocal slippage of the film turns, this latter fact causing a considerable wear of the film surface, or are complicated in design.

An object of the present invention is to provide a simple winding device enabling uniform unwinding of film rolls, even of the largest sizes, without reciprocal slippage of film turns while eliminating the necessity of rewinding film rolls from the end to beginning in case of repeated demonstration.

In the accomplishment of the foregoing object a movie projector winding device is used, consisting of an unwinder, said unwinder including a rotatable disc so installed that it can freely rotate with a film roll placed on said disc, a stationary part with rollers installed thereon, said rollers guiding the film while the latter is being unwound from inside the roll, and a means to impart rotation to the movable disc by the film while the latter is being unwound; and a winder, so designed as to accommodate a detachable spring core for winding the film thereon. The objects of the invention are attained by reason of the fact that the means to impart rotation to the movable disc by the film, while the latter is being unwound, has rollers fitted on axles, said axles being fixed to the stationary part of the unwinder for turning in the vertical plane so that a film turn coming off the inside of the roll and approaching the guide rollers can be pressed at its edge against the surface of the movable disc without contacting the rest of the roll.

To enable a free entry under the rollers of film turns coming off the roll, each of the rollers has a smoothly tapered cylindrical portion.

The roll unwinds without the reciprocal slippage of film turns, as the film turn approaching the vertical rollers is pressed from its edge against the movable disc.

To impart the initial torque to the movable disc with the roll, when initiating the drive of the movie projector, and to avoid a concentration of film turns at the vertical guide rollers, the unwinder is provided with a mechanism acting directly upon the movable disc from the film drawn out of the unwinder with the sprocket wheel of the movie projector.

For the same purpose, when using larger rolls, the unwinder may be provided with an electromagnetic unit including a one-way clutch, said unit being activated simultaneously with the actuation the projector.

To provide for a uniform unwinding of the film the unwinder is supplied with an adustable friction mechanism.

The invention will be described in greater detail with reference to an embodiment thereof as illustrated in the accompanying drawings, wherein:

FIG. 3 is a perspective view of a spring core;

Figure 5:
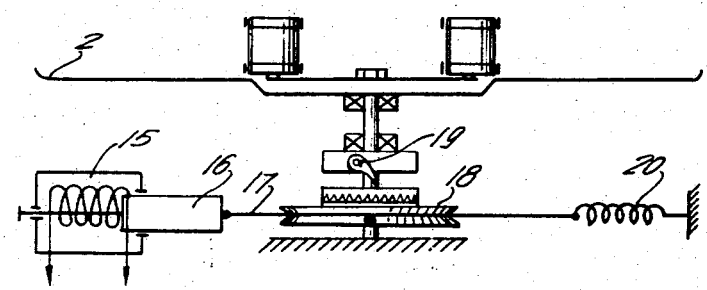
Figure 6:
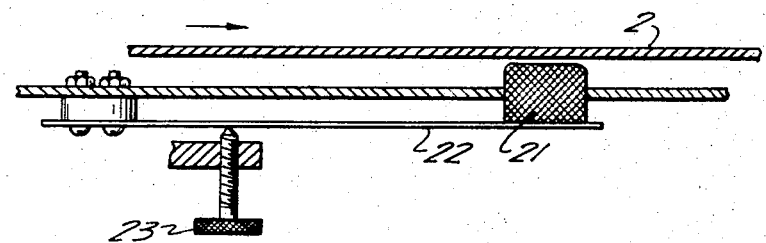
Figure 7:
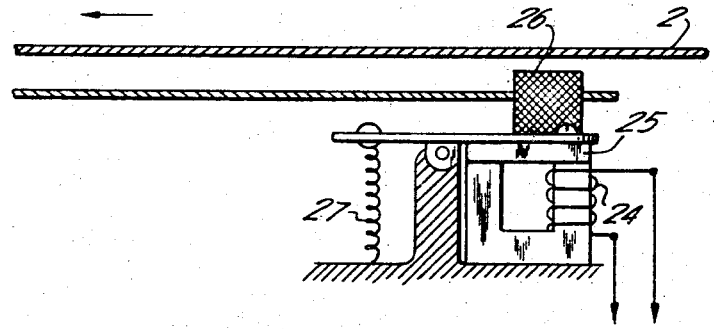

FIG. 4 diagrammatically shows in side sectional view the transmission of torque to a movable disc with a roll of film;

FIG. 5 is a diagrammatic view of an electromagnetic unit for imparting initial torque to a movable disc;

FIG. 6 is a diagrammatic view of a friction mechanism for ensuring a uniform unwinding of the film; and FIG. 7 is a diagrammatic view of an electromagnetic brake.

Figure 1:
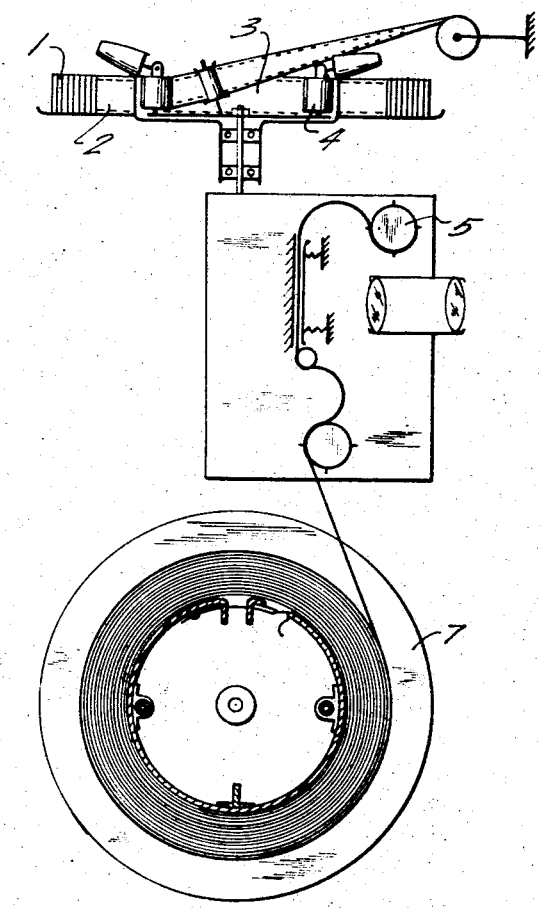
FIG. 1 is a diagrammatic view of a winding device according to the invention in a movie projector.

Roll 1 of film (FIG. 1) is placed on a rotatable disc 2 of an unwinder. A stationary part 3 houses guide rollers 4. The film is unwound from the interior of roll 1 and extends via guide rollers 4, to projector head sprocket 5, which draws the film out of the unwinder. The film, after passing through the film-feed gear of the projection head, is wound onto a detachable spring core (FIG. 3), fixed on pins 6 of disc 7 of a winder (FIG. 1).

Figure 2:
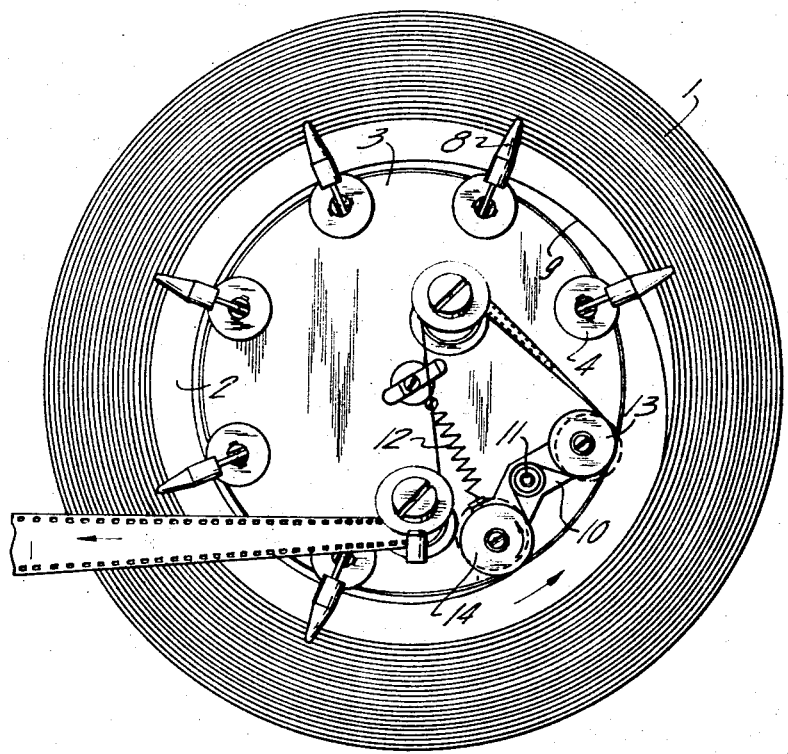
FIG. 2 is a plan view of an unwinder with a roll of film.

The placement of the film roll and the passing of the film in the unwinder is shown in FIG. 2.

Roll 1 together with the spring core shown in FIG. 3 is placed on rotatable disc 2; rollers 8 are thrown inwards, said rollers serving for pressing a film turn approaching vertical guide rollers 4 against movable disc 2. After roll 1 is placed, the spring core is removed. Several turns of film are extracted from the central part of the roll and inserted into the projector film-feed gear, as shown in FIGS. 1 and 2, rollers 8 being thrown back outwards. The principle, according to which rollers 8 work when unwinding the roll, is shown in FIG. 4. Rollers 8 press film turn 9 which approaches vertical guide rollers 4 against disc 2, to produce a torque in the direction of unwinding, said torque causing rotation of disc 2 with roll 1.

The working part of each of the rollers 8 has a cylindrical shape so that only the first film turn separated from the roll should be pressed against the disc 2 and not the rest of the roll, whereas a hinge, around which the axle of a roller turns in the vertical plane, is placed at such an elevation to the surface of the disc that the generatrix of a roller pressing the first turn of film is inclined to the horizontal plane at some angle (upwards). The forepart (entrance part) of the rollers is tapered in shape to provide for a free entry under the rollers of the film turns separating from the roll at the time when the first film turn is not yet pressed. The weight of rollers 8 should be the minimum sufficient for producing the necessary torque, which insures for the unwinding of film at a set mode of operation without a concentration of film turns at rollers 4.

The film is separated from roll 1, which is immovable with regard to disc 2, in turns, thus precluding the reciprocal slippage of film turns as well as the wear of the film surface.

However, when the projector is set in motion, the stabilization of the speed of rotation of disc 2 is somewhat delayed due to the absence of a kinematic connection between said disc and the projector head, as a result of which a certain number of film turns gather around vertical rollers 4. This phenomenon is more frequently observed when handling large rolls of film of 600 meters or more. For a faster stabilizing of the speed of rotation of the disc there may be used a device shown in FIG. 2, said device acting upon disc 2 directly behind the film. Said device is placed in the unwinder in the path of the unwinding film (FIG. 2) and comprises a double-arm lever 10 freely pivotable on immovable pin 11, spring 12 pulling at one of the arms of said lever, and three freely rotating rollers. The lower face of roller 13 is located above the surface of disc 2 carrying roll 1, whereas the face of roller 14 is below the surface of disc 2. When the tension of film increases, roller 14 becomes engaged with the inner edge of disc 2. With a further increase of tension caused by the action of the inertia loading of disc 2 with roll 1, said loading arising when the projector is set in motion, the afore-mentioned device assumes a position as indicated by the solid lines in FIG. 2. Roller 14 is set in rotation by the moving film in the direction indicated in FIG. 2 by an arrow, and, being pressed against the movable disc, sets the latter in rotation, thus precluding a concentration of film turns at rollers 4.

After the mode of rotation of disc 2 with roll 1 is established, the tension of the film decreases, and roller 13 and 14 under the influence of spring 12 assume a position as indicated by broken lines in FIG. 2, the rotation of disc 2 with roll 1 being no longer forced.

An electromagnetic unit, shown in FIG. 5, can be used for the same purpose.

Said device comprises a solenoid (or electromagnet) 15 operated simultaneously with the actuation of the projector, a core 16, a flexible ring 17 around a pulley 18, said pulley being connected with ratchet clutch 19, said clutch transmitting the initial torque to disc 2, and a spring 20 serving to return core 16 to its initial position. After transmitting the torque to disc 2, the ratchet clutch runs idle.

To provide for a uniform unwinding of the film from inside the roll, a friction mechanism is used as shown in FIG. 6. Friction shoe 21, fixed to spring lever 22, is pressed against the surface of disc 2. The force of contact of shoe 21 against disc 2 is adjusted by regulating screw 23.

To prevent a spontaneous unwinding of the film after the projector is stopped, the unwinder is provided with an electromagnetic brake shown in FIG. 7. Said brake operates as follows. The winding of electromagnet 24 is so connected that, when the electric motor of the projector is activated, said winding is automatically activated as well. Thus, when the projector is actuated, said winding attracts armature 25 of the electromagnet, to which armature brake shoe 26 is fixed. When the electric motor of the projector is stopped, the winding of the electromagnet is also cut off, as a result of which brake shoe 26, under the influence of spring 27, is pressed against the surface of disc 2, thus stopping the latter.

The film is not wound onto a spool, as in case of conventional winding devices, but onto the detachable spring core (FIG. 3) fixed on pins 6 (FIG. 1) of disc 7 of the winder. The spring core consists of hoop 28, grips 30 and buckles 31. When getting ready for projection, the film is wound onto the spring cores, the beginning of the film being at the inside of the roll. Then the reels of film are put into a film cabinet and rewound in the projection booth. When charging the unwinder, the spring core with a roll of film is placed onto disc 2 (FIGS. 1 and 2), and the core is subsequently removed from the roll by compressing hoop 28 by the grips 30. Due to its flexibility the hoop releases the roll of film. With the help of buckles 31 the spring core is then fixed on pins 6 (FIG. 1) of disc 7 of the winder.

We claim:
1. A movie projector winding device comprising an unwinder, said unwinder including a stationary part and a circular array of rollers mounted thereon, said rollers guiding the film during its unwinding from inside a roll, a rotatable disc installed around said stationary part, said disc being horizontally disposed with upper and lower surfaces and adapted to support a roll of film thereon, pressing rollers for pressing the inner convolutions of the roll of film against said disc to impart rotation to said disc while the film is being unwound, axles supporting said pressing rollers and fixed to said stationary part of said unwinder, means mounting said axles for pivotal movement in respective vertical planes so that a film turn, coming off the inside of said roll and approaching said guide rollers, can be pressed edgewise against the upper surface of said disc without pressing the remainder of said roll against the disc; a winder including a movable disc, a spring core, means on the latter said disc to accommodate said spring core detachably thereon for winding the film thereon; and means for imparting initial torque to said rotatable disc upon actuation of the drive of the projector, said means for imparting initial torque comprising a double-arm lever mounted for pivotal movement in a horizontal plane from a stationary part of said unwinder; film engaging rollers rotatably supported on said double-arm lever, at least one roller serving to guide the film and a second of said rollers serving to impart the initial torque to said rotatable disc, said second roller having a lower face below the upper surface of said rotatable disc, said second roller becoming engaged with said disc after an increase in the traction of film and transmitting the torque of said second roller to said disc; and a spring normally drawing said second roller away from said disc after the latter receives the initial torque.

2. A movie projector winding device comprising an operating circuit, an unwinder, said unwinder including a stationary part and a circular array of rollers mounted thereon, said rollers guiding the film during its unwinding from the inside of a roll of said film, a rotatable disc encircling said stationary part, said disc being horizontally disposed and adapted to support said roll of film thereon, pressing rollers for pressing the inner convolutions of the roll of film against said disc to impart rotation to said disc while the film is being unwound, axles supporting said pressing rollers and fixed to said stationary part of said unwinder, means mounting said axles for pivotal movement in respective vertical planes so that a film turn, coming off the inside of said roll and approaching said guide rollers, can be pressed edgewise against the surface of said disc without pressing the remainder of said roll against the disc; a winder including a movable disc, a spring core, means on the latter said disc to accommodate said spring core detachably thereon for winding the film thereon; and means for imparting initial torque to said rotatable disc upon actuation of the drive of the projector, said means for imparting initial torque comprising a solenoid including a core, means electrically connecting said solenoid with said operating circuit; a one-way clutch transmitting the initial torque to said rotatable disc; a transmission connecting said core with said clutch; and a spring returning said core to idle position after said rotatable disc receives the initial torque.

References Cited
UNITED STATES PATENTS

| | | | |
|---|---|---|---|
| 1,192,517 | 7/1916 | Hamann | 242—55.18 |
| 1,340,710 | 5/1920 | Graham | 242—75.4 |
| 1,784,138 | 12/1930 | Gottschau | 242—55.18 X |
| 2,255,724 | 9/1941 | Sunell | 242—55.19 |
| 2,285,070 | 6/1942 | Weber | 242—55.19 |

BILLY S. TAYLOR, *Primary Examiner.*